United States Patent (12)
Kakegawa et al.

(10) Patent No.: US 10,140,526 B2
(45) Date of Patent: Nov. 27, 2018

(54) OBJECT DETECTING DEVICE

(71) Applicant: Hitachi Automotive Systems, Ltd., Hitachinaka-shi, Ibaraki (JP)

(72) Inventors: Shinji Kakegawa, Tokyo (JP); Takeshi Shima, Tokyo (JP); Yuji Otsuka, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 68 days.

(21) Appl. No.: 15/500,814

(22) PCT Filed: Aug. 3, 2015

(86) PCT No.: PCT/JP2015/071899
§ 371 (c)(1),
(2) Date: Jan. 31, 2017

(87) PCT Pub. No.: WO2016/031494
PCT Pub. Date: Mar. 3, 2016

(65) Prior Publication Data
US 2017/0220877 A1 Aug. 3, 2017

(30) Foreign Application Priority Data

Aug. 26, 2014 (JP) .................................. 2014-171960

(51) Int. Cl.
*G06K 9/00* (2006.01)
*B60R 21/00* (2006.01)
(Continued)

(52) U.S. Cl.
CPC .......... *G06K 9/00791* (2013.01); *B60R 21/00* (2013.01); *B60W 10/04* (2013.01);
(Continued)

(58) Field of Classification Search
USPC ....... 382/100, 103–104, 106, 162, 168, 173, 382/181, 189–190, 199, 209, 219, 220,
(Continued)

(56) References Cited

U.S. PATENT DOCUMENTS 4,862,357 A * 8/1989 Ahlstrom ............... G06Q 10/02
705/6
6,487,303 B1 * 11/2002 Yamaguchi ............... G06T 7/74
382/103
(Continued)

FOREIGN PATENT DOCUMENTS

EP 2 713 309 A2 4/2014
EP 2 741 233 A2 6/2014
(Continued)

OTHER PUBLICATIONS

Extended European Search Report issued in corresponding application No. 15835840.8 dated Mar. 6, 2018.

*Primary Examiner* — Seyed Azarian
(74) *Attorney, Agent, or Firm* — Foley & Lardner LLP

(57) ABSTRACT

The purpose of the present invention is to provide an object detecting device which is capable of accurately detecting an object even far away, and of shortening processing time. Provided is an object detecting device (100), comprising: a disparity acquisition unit (116) which compares each image of two cameras (112, 113) and computes a disparity for each pixel; a near-far boundary setting unit (118) which, in a single image of one of the two cameras, sets a boundary (Rb) between a near region (R1) which is close to a vehicle (110) and a far region (R2) which is distant from the vehicle (110); a near object detecting unit (119) which detects objects (102, 104) of the near region (R1) on the basis of the disparity; and a far object detecting unit (120) which detects objects (103, 104) of the far region (R2) on the basis of the single image.

11 Claims, 7 Drawing Sheets

(51) Int. Cl.
*G06T 1/00* (2006.01)
*G08G 1/16* (2006.01)
*B60W 10/04* (2006.01)
*B60W 10/18* (2012.01)
*B60W 30/09* (2012.01)
*G06K 9/46* (2006.01)
*G06T 7/60* (2017.01)
*G01C 21/00* (2006.01)

(52) U.S. Cl.
CPC ............ *B60W 10/18* (2013.01); *B60W 30/09* (2013.01); *G06K 9/00805* (2013.01); *G06K 9/00825* (2013.01); *G06K 9/4604* (2013.01); *G06T 1/00* (2013.01); *G06T 7/60* (2013.01); *G08G 1/16* (2013.01); *G08G 1/165* (2013.01); *G08G 1/166* (2013.01); *B60W 2420/42* (2013.01); *B60W 2420/52* (2013.01); *B60W 2550/145* (2013.01); *B60W 2710/18* (2013.01); *B60W 2720/106* (2013.01); *G06T 2207/30252* (2013.01)

(58) Field of Classification Search
USPC ................ 382/254, 274, 276, 286–291, 305; 701/523; 705/6
See application file for complete search history.

(56) References Cited

U.S. PATENT DOCUMENTS

| | | | |
|---|---|---|---|
| 2009/0238407 A1* | 9/2009 | Tasaki | G06T 7/73 382/103 |
| 2013/0163821 A1* | 6/2013 | You | G06K 9/00208 382/104 |
| 2014/0379257 A1* | 12/2014 | You | G06K 9/00208 701/523 |

FOREIGN PATENT DOCUMENTS

| | | |
|---|---|---|
| JP | 10-143659 A | 5/1998 |
| JP | 2009-229226 A | 10/2009 |
| JP | 2013-134780 | 7/2013 |
| JP | 2013-140515 A | 7/2013 |
| JP | 2013-161187 A | 8/2013 |
| JP | 2014-110059 A | 6/2014 |

* cited by examiner (a)

(b)

OBJECT DETECTING DEVICE

TECHNICAL FIELD

The present invention relates to an object detecting device that detects an object on the basis of an image.

BACKGROUND ART

A driving support device for a vehicle using various sensors is developed worldwide. The driving support device can provide a function of automatic emergency braking (AEB) of applying automatic braking in an emergency or a function of adaptive cruise control (ACC) of automatically adjusting a speed according to a preceding vehicle. To provide the function of AEB or ACC, it is necessary to detect the preceding vehicle or an object such as an obstacle existing in front of an own vehicle.

As an object detecting device used for detecting the object, a device that operates three-dimensional coordinate position data in a three-dimensional coordinate system for each pixel of a distance image, on the basis of two-dimensional coordinate position data for each pixel of the distance image and distance data from a reference position for each pixel, and generates a three-dimensional distribution of pixels corresponding to a surface and a detection target object is known (for example, refer to PTL 1 described below).

In addition, a solid object detecting device that generates a grid map in which a three-dimensional distance data point group measured by a laser radar is accumulated, and determines a road surface and a solid object, is known (for example, refer to PTL 2 described below). The device divides three-dimensional distance information into solid object information to be three-dimensional information showing the solid object and plane information to be three-dimensional information showing a plane and extracts a grounding point position where the solid object contacts the plane, on the basis of the solid object information and plane information corresponding to a predetermined region around the solid object to which attention is paid. In addition, the device determines a search range of the solid object in an image, on the basis of the distance information and the grounding point position.

CITATION LIST

Patent Literature

PTL 1: Japanese Unexamined Patent Publication No. 10-143659
PTL 2: Japanese Unexamined Patent Publication No. 2013-140515

SUMMARY OF INVENTION

Technical Problem

In the object detecting device, it is required to detect an object accurately and quickly from a near region to a fax-region to realize quick and reliable driving support. In addition, it is required to maximally shorten processing time necessary for detection to quickly execute an operation for detecting the object and executing control.

However, in the object detecting device described in PTL 1, the surface is detected on the basis of the distance image and a pixel group of a predetermined height or more with the surface as a reference among pixel groups corresponding to the surface is detected as the detection target object. For this reason, erroneous detection or non-detection for a far object with small pixels may occur frequently.

In addition, in the solid object detecting device described in PTL 2, erroneous detection of the solid object existing on the road surface can be reduced. However, it is necessary to divide the distance data into the solid object and the road surface in advance to detect the solid object existing on the road surface. The division of the distance data becomes difficult in a far region where the distance data decreases.

The present invention has been made in view of the above problems and an object of the present invention is to provide an object detecting device that is capable of accurately detecting an object even far away and of shortening processing time.

Solution to Problem

In order to solve the above issue, an object detecting device according to the present invention is an object detecting device for detecting objects in front of a vehicle, on the basis of images of two cameras, including: a disparity acquisition unit which compares individual images of the two cameras and calculates a disparity for each pixel; a near-far boundary setting unit which sets a boundary between a near region close to the vehicle and a far region distant from the vehicle, in a single image of one of the two cameras; a near object detecting unit which detects an object of the near region, on the basis of the disparity; and a far object detecting unit which detects an object of the far region, on the basis of the single image.

Advantageous Effects of Invention

According to an object detecting device according to the present invention, a far object detecting unit detects an object of a far region on the basis of a single image of one of two cameras, so that the far object detecting unit can accurately detect an object even far away. In addition, a near object detecting unit detects an object of a near region on the basis of a disparity of the two cameras, so that the near object detecting unit can accurately detect a near object. In addition, a data processing amount can be decreased and processing time can be shortened.

DESCRIPTION OF EMBODIMENTS

An embodiment of an object detecting device according to the present invention is hereinafter described with reference to the drawings.

Figure 1:
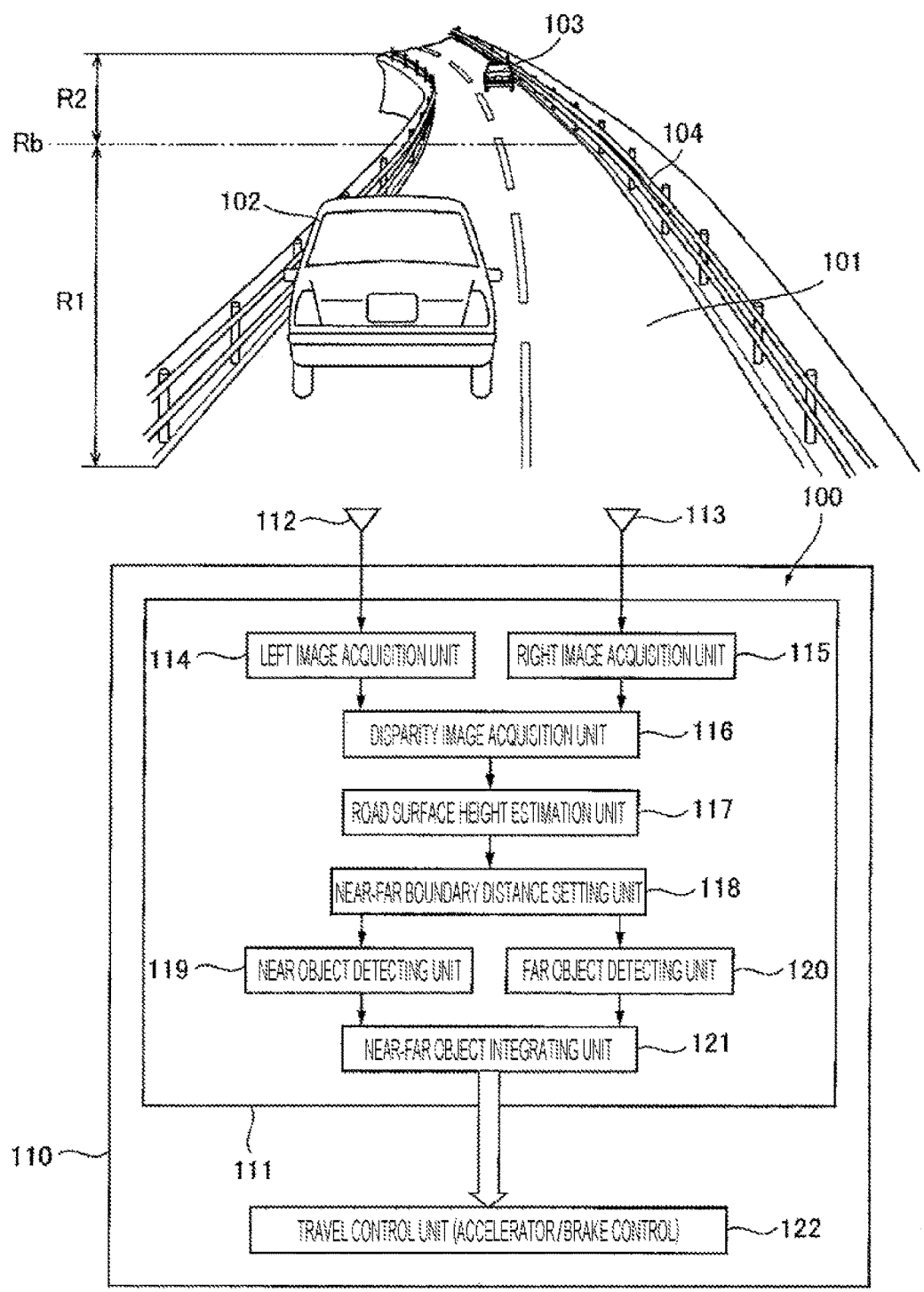
FIG. 1 is a system outline diagram illustrating an object detecting device according to an embodiment of the present invention.

FIG. 1 is a system outline diagram illustrating a schematic configuration of an object detecting device according to this embodiment and a peripheral portion thereof.

An object detecting device 100 according to this embodiment is a device that detects objects in front of a vehicle 110, on the basis of images of two cameras, and is configured using a stereo camera device 111 mounted on the vehicle 110, for example. The stereo camera device 111 is a device that photographs a front region of the vehicle 110, detects a road surface 101 in front of the vehicle 110 by image processing, and detects a near preceding vehicle 102 and a far preceding vehicle 103 of the vehicle 110 and an obstacle other than the vehicles, for example, a guardrail 104. The vehicle 110 includes the stereo camera device 111 and a travel control unit 122.

The stereo camera device 111 includes two cameras of a left camera 112 and a right camera 113, a left image acquisition unit 114 and a right image acquisition unit 115, a disparity image acquisition unit (disparity acquisition unit) 116, a road surface height estimation unit (road surface estimation unit) 117, a near-far boundary distance setting unit (near-far boundary setting unit) 118, a near object detecting unit 119 and a far object detecting unit 120, and a near-far object integrating unit 121.

The left camera 112 and the right camera 113 are a pair of imaging units that are disposed at positions separated from each other in a vehicle width direction of the vehicle 110 and images a front region of the vehicle 110 and each of the left camera 112 and the right camera 113 has an imaging element such as a CCD to convert light into a charge signal. The left image acquisition unit 114 acquires a charge signal from the left camera 112 every constant cycle and outputs a left image. The right image acquisition unit 115 acquires a charge signal from the right camera 113 at timing synchronized with the constant cycle and outputs a right image.

The disparity image acquisition unit 116 acquires the individual images of the two cameras, that is, the left image output from the left image acquisition unit 114 and the right image output from the right image acquisition unit 115, compares the left image and the right image, calculates a disparity for each pixel of the right image, and outputs a disparity image in which the disparity is stored for each pixel. Here, the disparity represents a deviation of the left and right images based on a distance of the vehicle width direction between the left camera 112 and the right camera 113 and the disparity is an amount that can be converted into a distance by a principle of triangulation. Hereinafter, the disparity of each pixel stored in the disparity image is called distance data for simplification.

The road surface height estimation unit 117 detects and estimates a position of the road surface 101, on the basis of the disparity image output from the disparity image acquisition unit 116, and outputs a height position of the road surface 101 and a farthest distance of the road surface 101. Here, the height position of the road surface 101 is a height from a ground plane to be a reference and a height position of the road surface 101 corresponding to each distance of a depth direction is output. In addition, the farthest distance of the road surface 101 shows a farthest distance from the vehicle 110 among distances of the road surface 101 detected by the road surface height estimation unit 117.

The near-far boundary distance setting unit 118 acquires the farthest distance of the road surface 101 output from the road surface height estimation unit 117, sets the farthest distance as a near-far boundary distance to be a boundary between a near region and a far region of the vehicle 110, and outputs the farthest distance. That is, the near-far boundary distance setting unit 118 sets a boundary Rb between a near region R1 close to the vehicle 110 and a far region R2 distant from the vehicle 110, in a single image of one of the two cameras, for example, the right image of the right camera 113.

The near object detecting unit 119 detects an object of the near region R1, on the basis of the disparity calculated by the disparity image acquisition unit 116. More specifically, the near object detecting unit 119 extracts a group of distance data in which the distance data to be the disparity of each pixel of the disparity image is continuous in a depth direction and a transverse direction, from the disparity image, using the disparity image in which the disparity calculated for each pixel of the near region R1 of the right image is stored for each pixel, and detects an object of the near region R1.

In other words, the near object detecting unit 119 extracts a group of distance data continuous in the depth direction and the transverse direction from the disparity image, in the near region R1 of the vehicle 110, on the basis of the disparity image output from the disparity image acquisition unit 116 and the near-far boundary distance output from the near-far boundary distance setting unit 118, detects the preceding vehicle 102 of the near region R1 and the obstacle such as the guardrail 104, and outputs a detection result.

The far object detecting unit 120 detects an object of the far region R2, on the basis of the right image of the right camera 113, for example. More specifically, the far object detecting unit 120 executes pattern matching using an image, in the far region distant from the vehicle 110, on the basis of the right image output from the right camera 113 and the boundary Rb to be the near-far boundary distance output from the near-far boundary distance setting unit 118. As a result, the far object detecting unit 120 detects the far preceding vehicle 103 and outputs a detection result.

The near-far object integrating unit 121 outputs detection results of the objects of the near region and the far region of the vehicle 110, on the basis of the detection result output from the near object detecting unit 119 and the detection result output from the far object detecting unit 120. Specifically, the near-far object integrating unit 121 integrates the detection results of the object of the near region R1 and the object of the far region R2 to prevent contradiction in a geometrical position relation, on the basis of the detection result of the preceding vehicle 102 of the near region R1 close to the vehicle 110 and the obstacle and the detection result of the preceding vehicle 103 of the far region R2 distant from the vehicle 110, and outputs a result.

The travel control unit 122 controls an accelerator and a brake, on the basis of the detection result of the preceding vehicles 102 and 103 output from the near-far object integrating unit 121 of the stereo camera device 111 or the obstacle such as the guardrail 104. As a result, the travel control unit 122 performs travel support of the vehicle 110 to cause the vehicle 110 to avoid a collision with the preceding vehicles 102 and 103 or the guardrail 104 or cause the vehicle 110 to automatically track the preceding vehicles 102 and 103.

Figure 2:
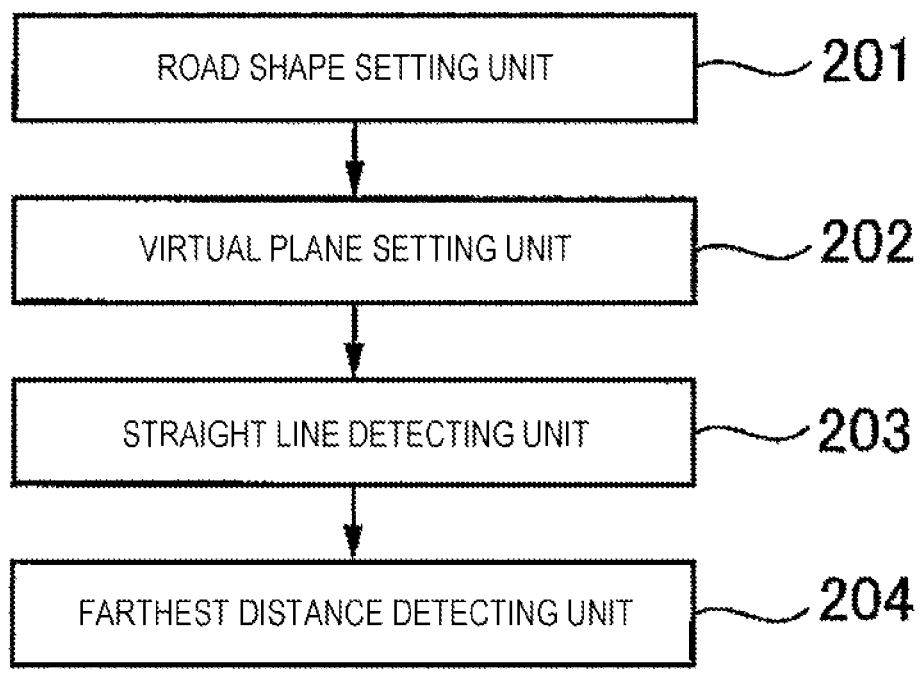
FIG. 2 is a block diagram illustrating a schematic configuration of a road surface estimation unit illustrated in FIG. 1.

FIG. 2 is a block diagram illustrating a schematic configuration of the road surface height estimation unit 117.

The road surface height estimation unit 117 includes a road shape setting unit 201, a virtual plane setting unit 202, a straight line detecting unit 203, and a farthest distance detecting unit {boundary pixel position detecting unit} 204, for example.

The road shape setting unit 201 sets a shape of a road on which the vehicle 110 is travelling, calculates an image region of the road obtained by projecting the set road shape onto an image, and outputs the image region. The virtual plane setting unit 202 projects distance data entering the image region of the road output from the road shape setting unit 201, that is, data of the disparity corresponding to each pixel and a coordinate position of each pixel as a histogram onto a two-dimensional virtual plane and outputs a V-Disparity image. Here, the virtual plane onto which the virtual plane setting unit 202 projects the distance data is a two-dimensional space in which a longitudinal axis shows a coordinate position V of a pixel of a longitudinal direction and a transverse axis shows a disparity. In addition, the V-Disparity image is an image in which a histogram frequency showing a total number of data points is stored for each pixel of a grid virtual plane.

The straight line detecting unit 203 acquires a V-Disparity image output from the virtual plane setting unit 202, detects a straight line transmitting a pixel in which a histogram frequency of the V-Disparity image is high, and calculates a road surface height position on the basis of the straight line. The farthest distance detecting unit 204 detects a distance of the farthest road surface 101 in which a road surface estimation result is reliable, on the basis of a road surface estimation result by the straight line detecting unit 203, and outputs the distance.

Figure 3:
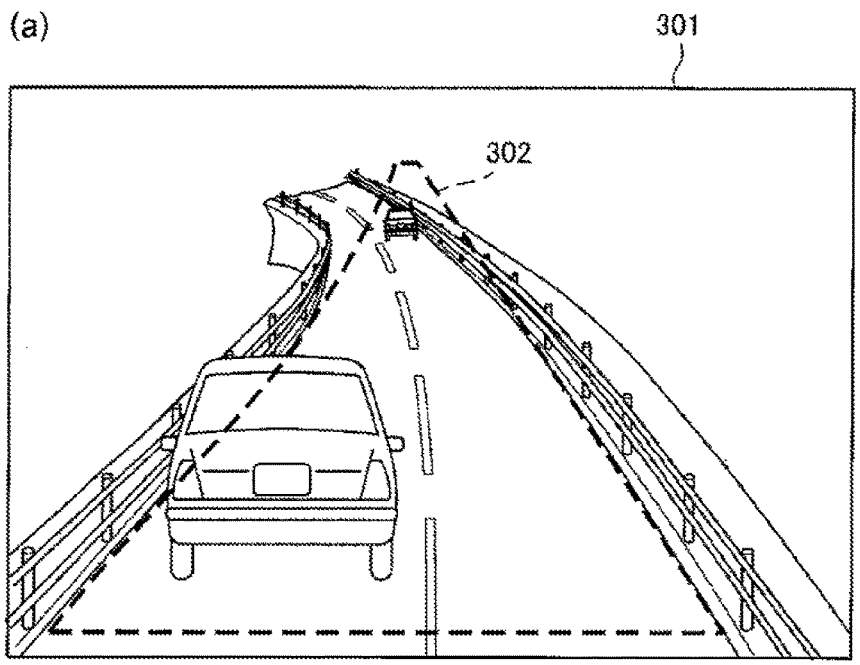
FIGS. 3(a) and 3(b) are image views illustrating processing by the road surface estimation unit.
Figure 3:
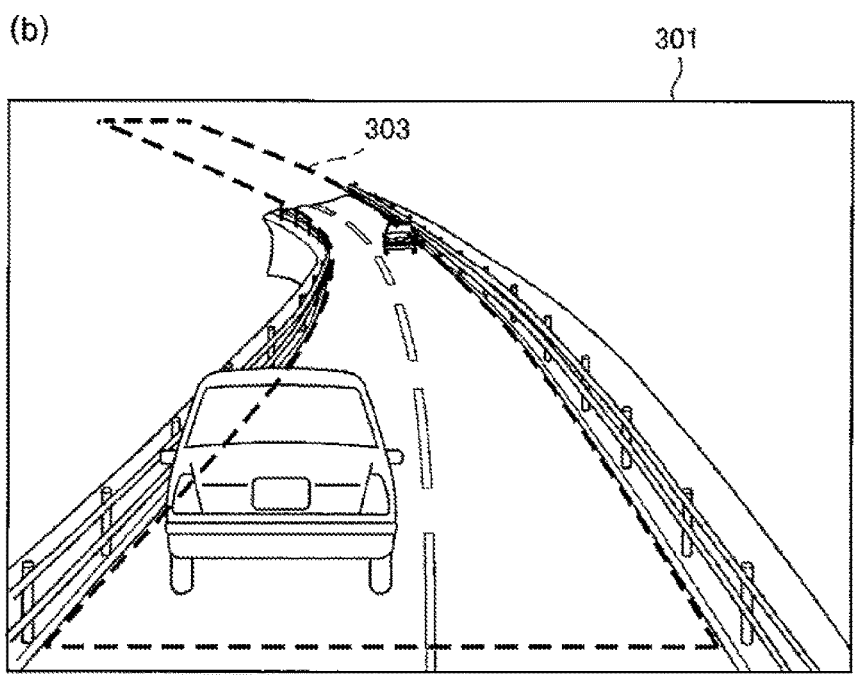

FIGS. 3(a) and 3(b) are image views illustrating processing by the road shape setting unit 201.

As illustrated in FIG. 3(a), the road shape setting unit 201 sets a region that is more likely to be a road in the right image 301, for example, a region such as a trapezoidal region 302 as a road shape. In the case in which a road surface extending in a straight direction and having a constant width and a constant gradient is assumed, the trapezoidal region 302 can be obtained by calculating a projection position of the road surface on an image. As such, in the case in which a shape of the road extending in the straight direction is assumed, when the road shape is actually curved, there is a problem in that a deviation occurs in the set road shape and the actual road shape.

In this case, the road shape setting unit 201 preferably estimates a curve direction of a successive road, estimates a road surface extending in a curve direction and having a constant width and a constant gradient, and calculates a projection position of the estimated road surface on an image, as illustrated in FIG. 3(b). Thereby, a curved region such as a curve region 303 can be set as the road shape. The curve direction of the road can be estimated by detecting a white line on the basis of image information or detecting a road shoulder on the basis of distance information.

Figure 4:
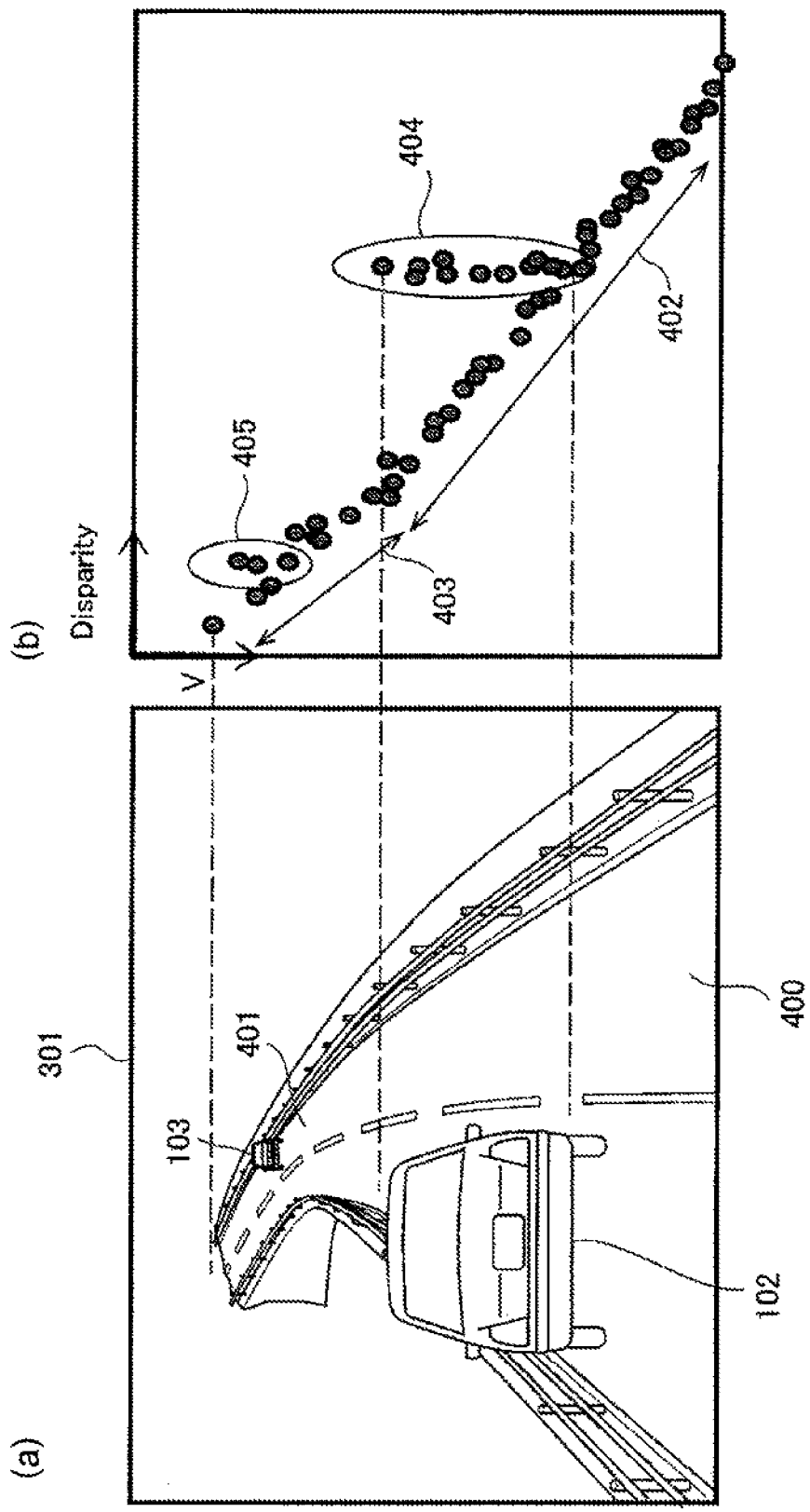
FIG. 4(a) is an image view illustrating processing by the road surface estimation unit and FIG. 4(b) illustrates a V-Disparity image.

FIG. 4(a) illustrates the right image 301 of the right camera 113 illustrating processing by the virtual plane setting unit 202. FIG. 4(b) illustrates a V-Disparity image obtained by projecting each distance data of a disparity image corresponding to the right image 301 onto the virtual plane.

A flat road surface 400 in a near region of the vehicle 110 and an ascending road surface 401 in a far region of the vehicle 110, which are illustrated in FIG. 4(a), have properties of being projected linearly in oblique directions having different gradients, like a first direction 402 and a second direction 403, on the V-Disparity image illustrated in FIG. 4(b). In addition, the obstacles such as the preceding vehicles 102 and 103 have properties of being projected linearly in a vertical direction, like data of regions 404 and 405 surrounded by solid lines.

In the road surface height estimation unit 117, distance data of the obstacles of the straight line shape of the vertical direction illustrated in the regions 404 and 405 becomes noise. Therefore, the road surface height estimation unit 117 calculates a relational expression representing a straight line of distance data of the road surface 400 along the first direction 402 and the second direction 403, without being affected by the noise.

Figure 5:
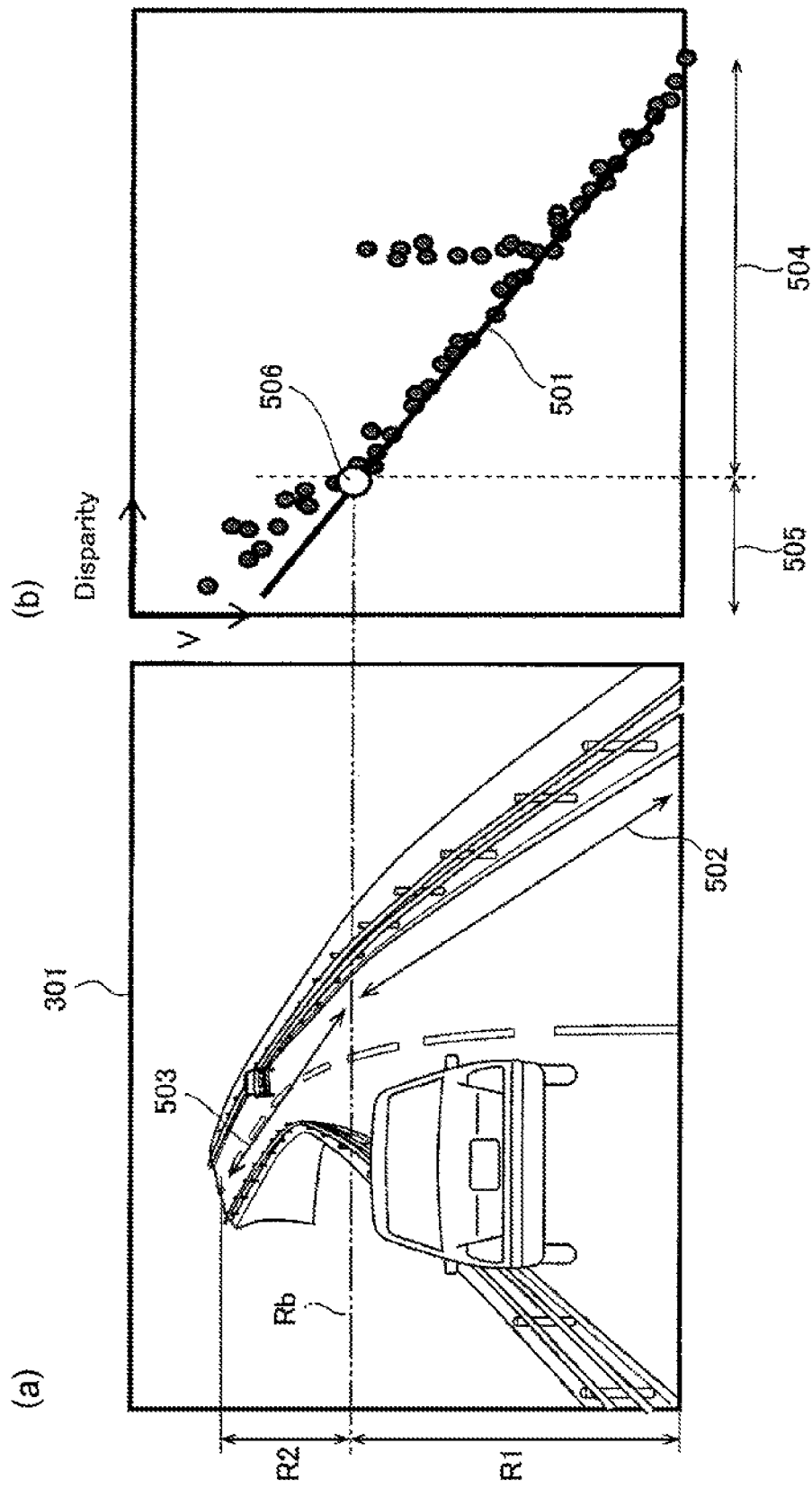
FIG. 5(a) is an image view illustrating processing by the road surface estimation unit and FIG. 5(b) illustrates a Y-Disparity image.

FIG. 5(a) illustrates the right image 301 of the right camera 113 illustrating processing by the straight line detecting unit 203 and the farthest distance detecting unit 204. FIG. 5(b) illustrates a V-Disparity image illustrating processing of the straight line detecting unit 203 and the farthest distance detecting unit 204.

For example, the straight line detecting unit 203 first converts the V-Disparity image into an image binarized with a constant threshold value and detects a straight line by Hough transformation, so that the straight line detecting unit 203 detects a most dominant straight line 501 in the V-Disparity image, as illustrated in FIG. 5(b). The straight line 501 shows a relation of a projected longitudinal position of an estimated road surface on an image and a disparity. The straight line detecting unit 203 converts the relation of the longitudinal position and the disparity into a relation of a distance of a depth direction of a depth direction of a three-dimensional space and a road surface height position and outputs a road surface height position for each distance.

In addition, in an example illustrated in FIG. 5(a), a gradient of a road surface 503 in the far region of the vehicle 110 changes with respect to a road surface 502 in the near region of the vehicle 110. For this reason, the straight line 501 detected OR the V-Disparity image illustrated in FIG. 5(b) fits with distance data of a road surface well in a near region 504 of the vehicle 110. However, it is known that the straight line 501 generates a deviation with a position of distance data of an actual road surface in a far region 505 of the vehicle 110 and reliability of a road surface estimation result is low.

The farthest distance detecting unit 204 detects and outputs a farthest distance of the road surface 502 where a road surface estimation result is reliable, in the near region of the vehicle 110. For this reason, the farthest distance detecting unit 204 confirms a histogram frequency of each pixel which the straight line 501 detected by the straight line detecting unit 203 passes through sequentially from a near side of the vehicle 110 and detects a first pixel position when pixels where histogram frequencies become a constant value or less are continuous by a constant number or more as a boundary pixel position 506.

That is, the farthest distance detecting unit 204 to be a boundary pixel position detecting unit detects the boundary pixel position 506, on the basis of a deviation of the straight line 501 in the V-Disparity image and a position of distance data. The farthest distance detecting unit 204 converts a disparity in the boundary pixel position 506 into a distance and calculates a farthest distance of the road surface 502 in the near region R1 of the vehicle 110.

As such, a range of the road surface 502 closer to the vehicle 110 than the boundary pixel position 506 to be a farthest distance can be regarded as the near region R1 of the vehicle 110 where reliability of a road surface estimation result, that is, a distance to the road surface 502 is high. In addition, a range of the road surface 503 more distant from the vehicle 110 than the boundary pixel position 506 to be the farthest distance can be regarded as the far region R2 of the vehicle 110 where reliability of a road surface estimation result, that is, a distance to the road surface 503 is low.

In this way, the road surface height estimation unit 117 calculates the distances to the road surfaces 502 and 503 in front of the vehicle 110, on the basis of the disparity calculated by the disparity image acquisition unit 116, and detects the boundary pixel position 506 between the region 504 where reliability of the distance to the road surface 502 is high and the region 505 where reliability of the distance to the road surface 503 is low. In addition, the near-far boundary distance setting unit 118 sets the boundary Rb between the near region R1 and the far region R2, on the basis of the boundary pixel position 506.

Figure 6:
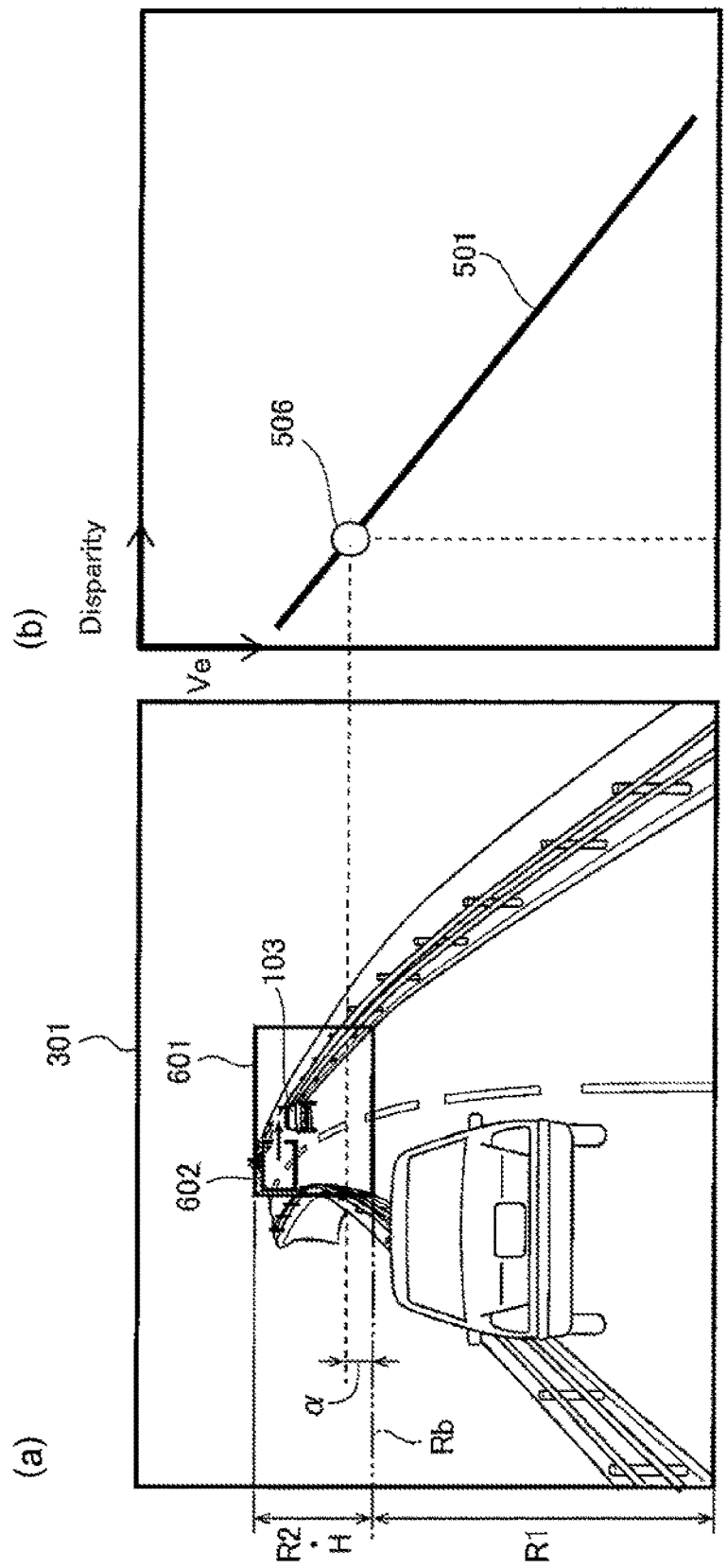
FIG. 6(a) is an image view illustrating processing by a far object detecting unit and FIG. 6(b) illustrates a V-Disparity image.

FIG. 6(a) illustrates the right image of the right camera 113 illustrating processing by the far object detecting unit 120. FIG. 6(b) illustrates a V-Disparity image illustrating processing by the far object detecting unit 120.

The far object detecting unit 120 acquires the right image output from the right camera 113 and illustrated in FIG. 6(a), the boundary pixel position 506 showing the near-far boundary distance output from the farthest distance detecting unit 204, and the trapezoidal region 302 to be an image region of the road shape output from, the road shape setting unit 201. In addition, the far object detecting unit 120 sets a search range 601 of a preceding vehicle to the far region R2 on the right image.

Using an estimation error α between a coordinate position of a longitudinal direction of a pixel at the boundary Rb of the right image of the right camera 113 and the boundary pixel position 506 of the V-Disparity image, the far object detecting unit 120 sets one end of a longitudinal direction of the search range 601 to a position to be a sum of the boundary pixel position 506 and the estimation error α. That is, the far object detecting unit 120 performs setting such that a lower end position of the search range 601 becomes a sum Ve+α of an image longitudinal position Ve at the boundary pixel position 506 of the straight line 501 of the road surface estimation result illustrated in FIG. 6(b) and the estimation error α.

Here, the estimation error α is a previously set value of an estimation error of an image longitudinal position of a road surface assumed at the boundary pixel position 506 of the road surface estimation result. The estimation error α tends to become relatively small on an expressway where the road surface 502 is relatively flat and tends to become relatively large on a general road where a gradient of the road surface 502 is large. Therefore, the estimation error α may be calculated sequentially and changed, according to a travel situation of the vehicle 110.

Using an image longitudinal width H of an object of a maximum height assumed at the boundary Rb of the right image of the right camera 113, the far object detecting unit 120 sets the other end of the longitudinal direction of the search range 601 to a position obtained by subtracting the image longitudinal width H and the estimation error α from the boundary pixel position 506. That is, the far object detecting unit 120 performs setting such that an upper end position of the search range 601 becomes Ve−H−α obtained by subtracting the value α and the image longitudinal width H from the image longitudinal position Ve at the boundary pixel position 506. Here, the image longitudinal width H is an image longitudinal width when a vehicle having a maximum vehicle height assumed at the boundary pixel position 506 is projected onto an image.

The far object detecting unit 120 sets positions of left and right ends of the search range 601 to positions of left and right ends of the trapezoidal region 302 to be the image region of the road shape at the boundary pixel position 506. In this way, the far object detecting unit 120 sets the search range 601 to an image range where there may be a vehicle after the boundary pixel position 506.

Next, the far object detecting unit 120 scans a template 602 in the search range 601, executes pattern matching, and detects the preceding vehicle 103 in the far region R2 distant from the vehicle 110. The far object detecting unit 120 previously learns a feature of an image of the preceding vehicle 103 in the pattern matching and compares a learned feature amount and a feature amount of an image of the template 602. In addition, when a difference of the feature amounts is a constant amount or less, the far object detecting unit 120 assumes a target object as the vehicle and detects the preceding vehicle 103 at a position of the template.

A size of an image onto which the preceding vehicle 103 is projected is different according to a distance where the targeted preceding vehicle 103 exists. For this reason, using a plurality of templates 602 having different sizes, the far object detecting unit 120 repetitively executes detection processing of the preceding vehicle by the search by the number of templates 602 having the different sizes. As such, the far object detecting unit 120 executes object detection processing using the camera image output from the right camera 113, in only the far region R2 distant from the vehicle 110.

Figure 7:
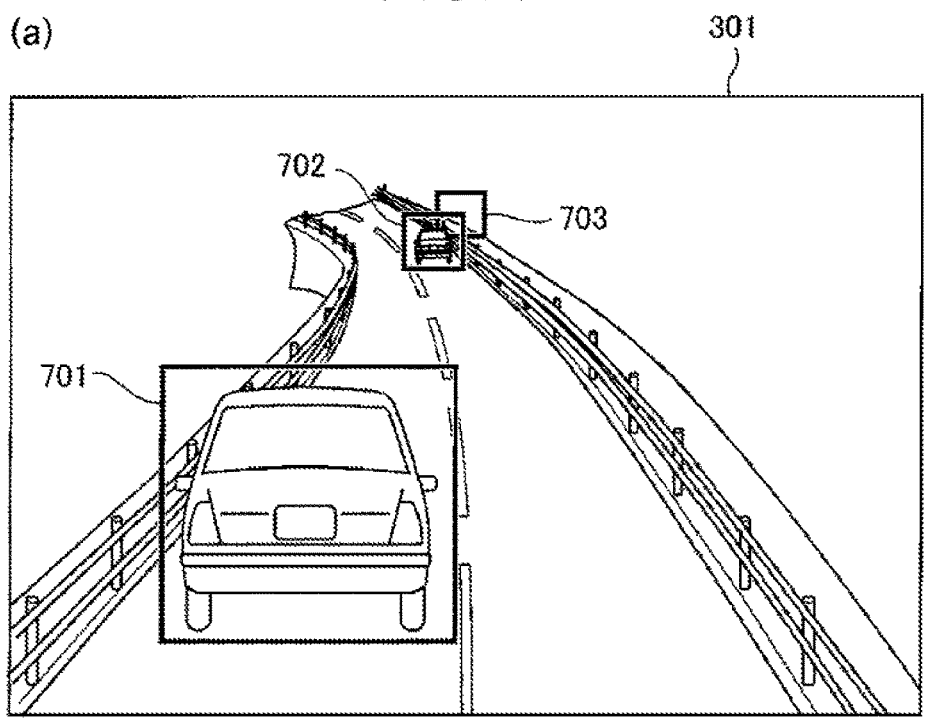
FIGS. 7(a) and 7(b) are image views illustrating processing by a near-far object integrating unit.
Figure 7:
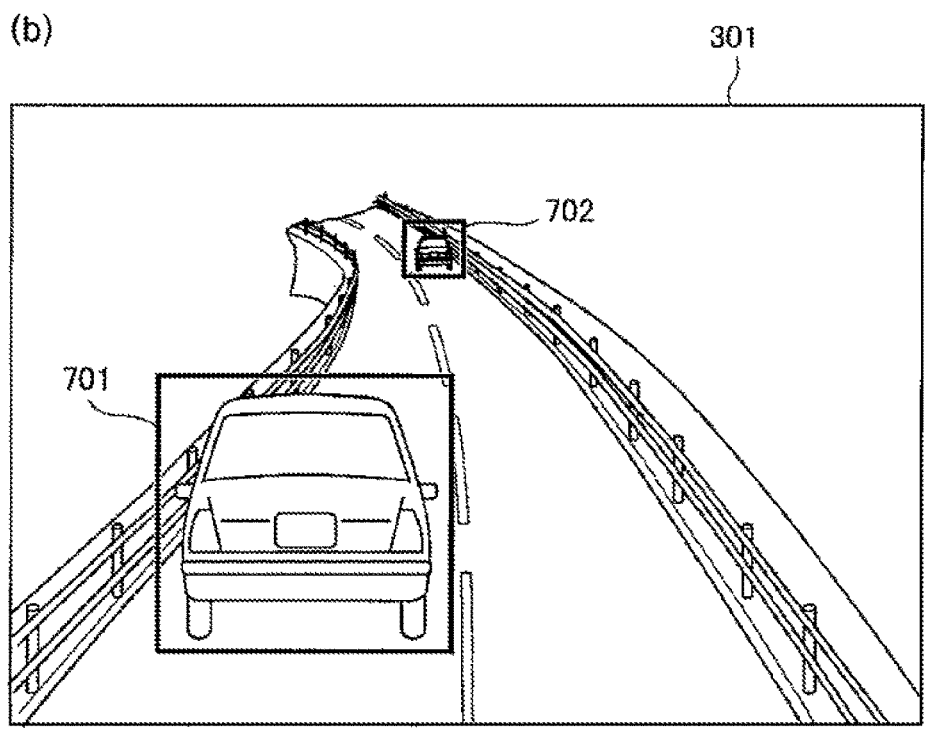

FIGS. 7(a) and 7(b) illustrate right images of the right camera 113 illustrating processing by the near-far object integrating unit 121.

As illustrated in FIG. 7(a), when a detection result 701 of a near object such as the preceding vehicle 102 is obtained by the near object detecting unit 119 and detection results 702 and 703 of far objects such as the preceding vehicle 103 are obtained by the far object detecting unit 120, the near-far object integrating unit 121 checks a position relation of the near object and the far object. In addition, the near-far object integrating unit 121 erases an object of a long distance for detection objects overlapping each other on an image, like the detection results 702 and 703.

In an example illustrated in FIG. 7(a), the near-far object integrating unit 121 erases the detection result 703 of the long distance in the detection results 702 and 703 overlapping each other on the image. As a result, the near-far object integrating unit 121 outputs the detection results 701 and 702 as near-far objects, as illustrated in FIG. 7(b). Even when a detection result in the near region of the vehicle 110 and a detection result in the far region of the vehicle 110 overlap each other on the image, the near-far object integrating unit 121 erases the detection result of the long distance. As such, the reason why the object of the long distance is erased when the object regions to be the detection results overlap each other on the image is that the object of the long distance is shielded by the object of the short distance and is not viewed and the possibility of erroneous detection is high.

Hereinafter, functions of the object detecting device 100 according to this embodiment will be described.

As described above, for example, in the object detecting device according to the related art described in PTL 1, a surface is detected on the basis of a distance image and a pixel group of a predetermined height or more with the surface as a reference among pixel groups corresponding to the surface is detected as a detection target object. For this reason, erroneous detection or non-detection for a far object with small pixels may occur frequently. This is because an information amount obtained from a sensor in the far region is smaller than an information mount in the near region, the number of distance data to be obtained is small, and precision of the distance obtained from the sensor is lowered.

As such, if the number of road surface data to be obtained is small and the precision of the distance is lowered, separation of distance data of a far object and distance data of a road surface becomes difficult, a position error of the road surface to be estimated in the far region increases, and error detection or non-detection of the object is generated. For example, the position of the road surface is estimated at a position below an actual position, so that the region of the road surface may be detected as the object (erroneous detection), or the position of the road surface is estimated at a position on the actual position, so that the object existing on the road surface may not be detected (non-detection).

In addition, in the solid object detecting device according to the related art described in PTL 2, erroneous detection of a solid object existing on the road surface can be reduced. However, it is necessary to divide the distance data into the solid object and the road surface in advance to detect the solid object existing on the road surface. The division of the distance data becomes difficult in the far region where the distance data decreases. When the solid object cannot be divided as a solid object correctly in the far region, there is concern that non-detection of the object may not be prevented.

In the case in which an image is searched and an image feature amount is compared and evaluated, when an image size cannot be reduced sufficiently and a search range of the image cannot be narrowed sufficiently, processing time tends to increase as compared with the case of detecting an object from, the distance data as in PTL 1. Particularly, because the image size of the object increases in the near region and the image search range when the image is searched is widened, there is concern that the processing time may increase greatly as compared with the method described in PTL 1.

Meanwhile, the object detecting device 100 according to this embodiment includes not only the disparity image acquisition unit (disparity acquisition unit) 116 comparing the individual images of the left and right two cameras 112 and 113 and calculating the disparity for each pixel but also the near-far boundary distance setting unit (near-far boundary setting unit) 118. In addition, the boundary Rb between the near region R1 close to the vehicle 110 and the far region R2 distant from the vehicle 110 in the right image to be the single image of the right camera 113 of the left and right two cameras is set by the near-far boundary distance setting unit 118. In addition, the object of the near region R1 is detected by the near object detecting unit 119 on the basis of the disparity and the object of the far region R2 is detected by the far object detecting unit 120 on the basis of the right image.

As a result, the object detecting device 100 can detect the object of the far region R2 with the small pixels in which the detection of the object by the distance data is difficult can be accurately detected on the basis of the right image of the right camera 113, without depending on the distance data. Therefore, according to the object detecting device 100 according to this embodiment, occurrence of erroneous detection or non-detection of the object in the far region R2 can be suppressed and the object can be detected accurately even in the far region of the vehicle 110. In addition, the processing target when the object is detected from the distance data based on the disparity can be narrowed to the near region R1, the data processing amount can be decreased, and the processing time can be shortened.

The object detecting device 100 according to this embodiment further includes the road surface height estimation unit (road surface estimation unit) 117 that calculates the distance to the road surface in front of the vehicle 110 on the basis of the disparity and detects the boundary pixel position 506 between the region where the reliability of the distance is high and the region where the reliability of the distance is low. In addition, in the object detecting device 100 according to this embodiment, the near-far boundary distance setting unit (near-far boundary setting unit) 118 sets the boundary Rb on the basis of the boundary pixel position 506. As a result, the reliability of the distance data in the near region R1 can be increased and the detection precision of the object in the near region R1 can be improved.

In addition, the road surface height estimation unit 117 includes the virtual plane setting unit 202, the straight line detecting unit 203, and the farthest distance detecting unit (boundary pixel position detecting unit) 204. The virtual plane setting unit 202 outputs the V-Disparity image and the straight line detecting unit 203 detects the most dominant straight line 501 in the V-Disparity image. In addition, the farthest distance detecting unit 204 detects the boundary pixel position 506 on the basis of the deviation of the straight line 501 in the V-Disparity image and the position of the distance data. Thereby, the boundary pixel position 506 between the region 504 where the reliability of the distance to the road surface is high and the region 505 where the reliability of the distance is low can be detected by the road surface height estimation unit 117.

In addition, the far object detecting unit 120 sets the search range 601 to the far region R2 on the right image, scans the template 602 in the search range 601, and detects the object of the far region R2 by the pattern matching. As a result, the object can be detected accurately on the basis of the right image, without depending on the distance data, in the tar region R2.

In addition, the far object detecting unit 120 sets the lower end of the longitudinal direction of the search range 601 to the position to be the sum of the boundary pixel position 506 and the estimation error $\alpha$, using the estimation error $\alpha$ between the coordinate position of the longitudinal direction of the pixel at the boundary Rb of the right image and the boundary pixel position 506 of the V-Disparity image. As a result, the search range 601 can be set in a more appropriate range having considered the estimation error $\alpha$.

In addition, the far object detecting unit 120 sets the upper end of the longitudinal direction of the search range 601 to a position obtained by subtracting the image longitudinal width H and the estimation error $\alpha$ from the boundary pixel position 506, using the image longitudinal width H of the object of the maximum height assumed at the boundary Rb of the right image. As a result, the search range 601 can be set in a more appropriate range having considered the estimation error $\alpha$ and the image longitudinal width H.

The object detecting device 100 according to this embodiment further includes the road shape setting unit 201 that sets the road shape in front of the vehicle 110 using the right image. In addition, the far object detecting unit 120 sets the positions of the left and right ends of the search range 601 to the positions of the left and right ends of the image region of the road shape. As a result, the search range 601 can be further narrowed and the processing time can be shortened.

In addition, the far object detecting unit 120 scans the search range 601 repetitively using the plurality of templates 602 having the different sizes. As a result, detection from the preceding vehicle close to the vehicle 110 to the preceding vehicle distant from the vehicle 110 in the far region R2 can be performed surely.

The object detecting device 100 according to this embodiment further includes the near-far object integrating unit 121 that erases the detection result 703 of the object of the long distance in the detection results 702 and 703 of the objects displayed on the right image and overlapping each other. As a result, the detection result 703 that is more likely to be detected by the erroneous detection can be erased and the erroneous detection can be reduced.

In addition, the near object detecting unit 119 extracts a group of distance data in which distance data to be the disparity of each pixel of the disparity image is continuous in the depth direction and the transverse direction, from the disparity image, using the disparity image in which the disparity calculated for each pixel of the near region R1 of the right image is stored for each pixel, and detects the object of the near region R1. As a result, the near object detecting unit 119 can detect the object of the near region R1 accurately on the basis of the disparity.

The embodiment of the present invention has been described in detail using the drawings. However, the specific configuration is not limited to the embodiment and a design change made without departing from the scope of the present invention is included in the present invention.

For example, in the embodiment, the example of the case in which the far preceding vehicle is detected by the object detecting device has been described. However, the object detecting device according to the present invention can be applied to even when a pedestrian or other obstacle is detected, in addition to detection of the preceding vehicle.

In addition, in the embodiment, the example of the case in which the stereo camera device is used has been described. However, the present invention can be applied to a sensor configuration in which image information and distance information are obtained as sensor output values, such as a monocular camera and a laser radar and the monocular camera and a millimeter wave radar, in addition to the stereo camera.

In addition, in the embodiment, the example of the driving support device for the vehicle that detects the preceding vehicle existing on the road surface by the object detecting device and performs travel control has been described. However, the present invention can be applied to a peripheral monitoring device and a driving support device for a ship that detect a marine obstacle and a peripheral monitoring device and a driving support device for an airplane that detect an obstacle on a ground plane, in addition to the driving support device for the vehicle.

In addition, in the embodiment, the object is detected using only the right image of the camera in the far region distant from the vehicle. However, the object may be detected using the right image or the left image and the disparity image together.

REFERENCE SIGNS LIST 100 object detecting device
101 road surface
102, 103 preceding vehicle (object)
104 guardrail (object)
110 vehicle
112 left camera (camera)
113 right camera (camera)
116 disparity image acquisition unit (disparity acquisition unit)
117 road surface height estimation unit (road surface estimation unit)
118 near-far boundary distance setting unit (near-far boundary setting unit)
119 near object detecting unit
120 far object detecting unit
121 near-far object integrating unit
122 travel control unit
201 road shape setting unit
202 virtual plane setting unit
203 straight line detecting unit
204 farthest distance detecting unit (boundary pixel position detecting unit)
302 trapezoidal region (road shape)
303 curve region (road shape)
400, 401 road surface
502, 503 road surface
504 region where reliability of distance is high
505 region where reliability of distance is low
506 boundary pixel position
601 search range
602 template
H image longitudinal width
R1 near region
R2 far region
Rb boundary
α estimation error

The invention claimed is:

1. An object detecting system comprising:
two cameras configured to capture images in front of a vehicle; and
a processor configured to:
compare individual images of the two cameras and calculate a disparity for each pixel;
set a boundary between a near region close to the vehicle and a far region distant from the vehicle, in a single image of one of the two cameras;
detect an object of the near region, on the basis of the disparity; and
detect an object of the far region, on the basis of the single image,
wherein the processor configured to set the boundary further comprises the processor configured to:
output a V-Disparity image obtained by projecting, onto a virtual plane where a first axis shows the disparity and a second axis shows a coordinate position of a longitudinal direction of each pixel of the single image, data of the disparity and the coordinate position corresponding to each pixel of the single image.

2. The object detecting system according to claim 1, wherein the processor is further configured to:
erase a detection result of a long distance in detection results of the objects displayed on the single image and overlapping each other.

3. The object detecting system according to claim 1, wherein the processor is further configured to:
extract, using a disparity image in which a disparity calculated for each pixel of the near region of the single image is stored for each pixel, a group of the distance data in which distance data to be the disparity of each pixel of the disparity image is continuous in a depth direction and a transverse direction, from the disparity image, and detects the object of the near region.

4. An object detecting device for detecting objects in front of a vehicle, the object detecting device comprising:
a processor configured to:
compare individual images of two cameras and calculate a disparity for each pixel, wherein the individual images are captured by the two cameras;
set a boundary between a near region close to the vehicle and a far region distant from the vehicle, in a single image of one of the two cameras;
detect an object of the near region, on the basis of the disparity; and
detect an object of the far region, on the basis of the single image,
wherein the processor is further configured to:
calculate a distance to a road surface in front of the vehicle, on the basis of the disparity, and detect a boundary pixel position between a region where reliability of the distance is high and a region where the reliability of the distance is low; and
set the boundary on the basis of the boundary pixel position, and
wherein the processor is further configured to:
output a V-Disparity image obtained by projecting, onto a virtual plane where a transverse axis shows the disparity and a longitudinal axis shows a coordinate position of a longitudinal direction of each pixel of the single image, data of the disparity and the coordinate position corresponding to each pixel of the single image;
detect a most dominant straight line in the V-Disparity image; and
detect the boundary pixel position, on the basis of a deviation of the straight line in the V-Disparity image and a position of the data.

5. The object detecting device according to claim 4, wherein the processor is further configured to:
set a search range to the far region on the single image, scan a template in the search range, and detect the object of the far region by pattern matching.

6. The object detecting device according to claim 5, wherein the processor is further configured to:
set using an estimation error between a coordinate position of a longitudinal direction of a pixel at the boundary of the single image and the boundary pixel position of the V-Disparity image, one end of a longitudinal direction of the search range to a position to be a sum of the boundary pixel position and the estimation error.

7. The object detecting device according to claim 6, wherein the processor is further configured to:
set the other end of the longitudinal direction of the search range to a position obtained by subtracting an image longitudinal width of an object of a maximum height assumed at the boundary of the single image and the estimation error from the boundary pixel position, using the image longitudinal width.

8. The object detecting device according to claim 5, wherein the processor is further configured to:
set a road shape in front of the vehicle using the single image,
wherein the processor sets positions of left and right ends of the search range to positions of left and right ends of an image region of the road shape.

9. The object detecting device according to claim 5, wherein the processor is further configured to:
scan the search range repetitively using a plurality of templates having different sizes.

10. The object detecting device according to claim 4, wherein the processor is further configured to:
erase a detection result of a long distance in detection results of the objects displayed on the single image and overlapping each other.

11. The object detecting device according to claim 4, wherein the processor is further configured to:
extract, using a disparity image in which a disparity calculated for each pixel of the near region of the single image is stored for each pixel, a group of the distance data in which distance data to be the disparity of each pixel of the disparity image is continuous in a depth direction and a transverse direction, from the disparity image, and detects the object of the near region.

* * * * *